United States Patent [19]

Gerbig

[11] Patent Number: 4,601,737
[45] Date of Patent: Jul. 22, 1986

[54] AIR FILTER SYSTEM FOR CLEAN ROOM

[76] Inventor: Fred T. Gerbig, 2990 Brenner St., Roseville, Minn. 55113

[21] Appl. No.: 682,325

[22] Filed: Dec. 17, 1984

[51] Int. Cl.⁴ .............................................. B01D 46/44
[52] U.S. Cl. ........................................ 55/493; 55/502; 55/508; 55/DIG. 31
[58] Field of Search ................. 55/355, 483, 484, 493, 55/502, DIG. 31, 508, 494, 495, 497, 521; 98/40.05

[56] References Cited

U.S. PATENT DOCUMENTS

| | | | |
|---|---|---|---|
| 3,280,540 | 10/1966 | Soltis | 55/493 X |
| 3,350,862 | 11/1967 | Nutting | 55/493 |
| 3,360,910 | 5/1966 | Soltis | 55/483 |
| 3,470,679 | 10/1969 | Ramsey | 55/502 X |
| 3,486,311 | 12/1967 | Allan, Jr. | 55/355 |
| 3,740,934 | 6/1973 | Shuler | 55/502 X |
| 4,171,211 | 10/1979 | Carter | 55/493 |
| 4,217,121 | 8/1980 | Fichter | 55/493 X |
| 4,422,861 | 12/1983 | Dusza | 55/502 X |

Primary Examiner—Charles Hart
Attorney, Agent, or Firm—Jacobson and Johnson

[57] ABSTRACT

A filter media contained in a rectangular frame rests on and covers the opening of an overhead rectangular support frame, preferably constructed out of metal channel bars with a resilient seal between the filter frame and the support frame and a spring loaded clamp for adjustably and releasably holding the filter frame snugly against the support frame.

10 Claims, 4 Drawing Figures

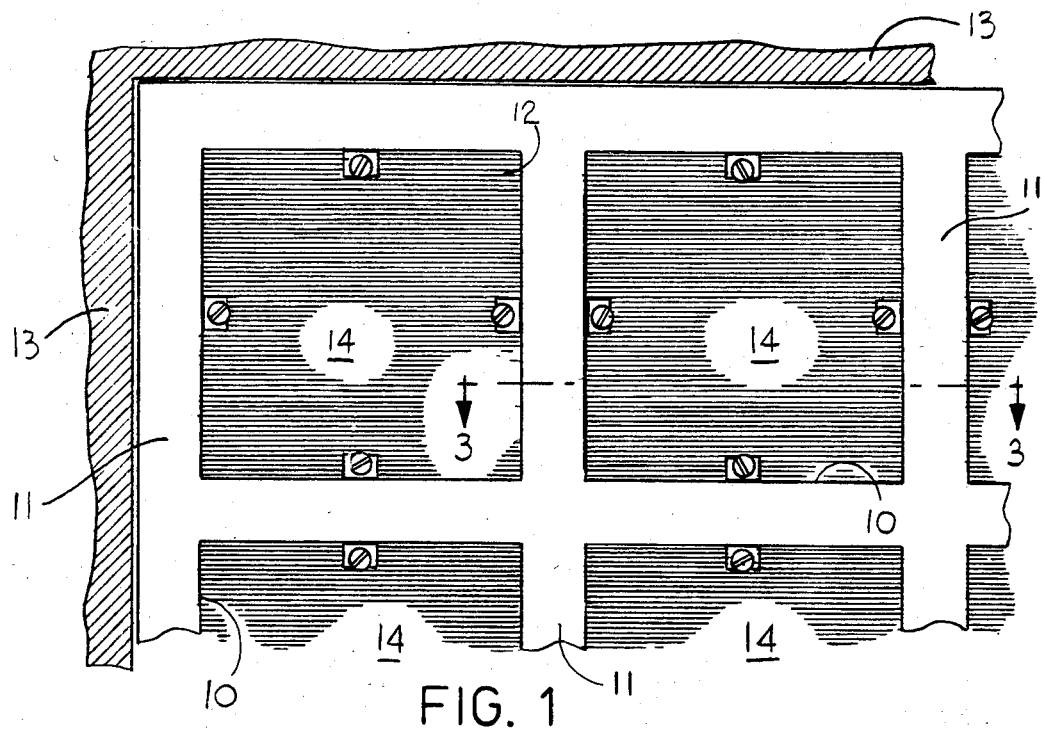
FIG. 1
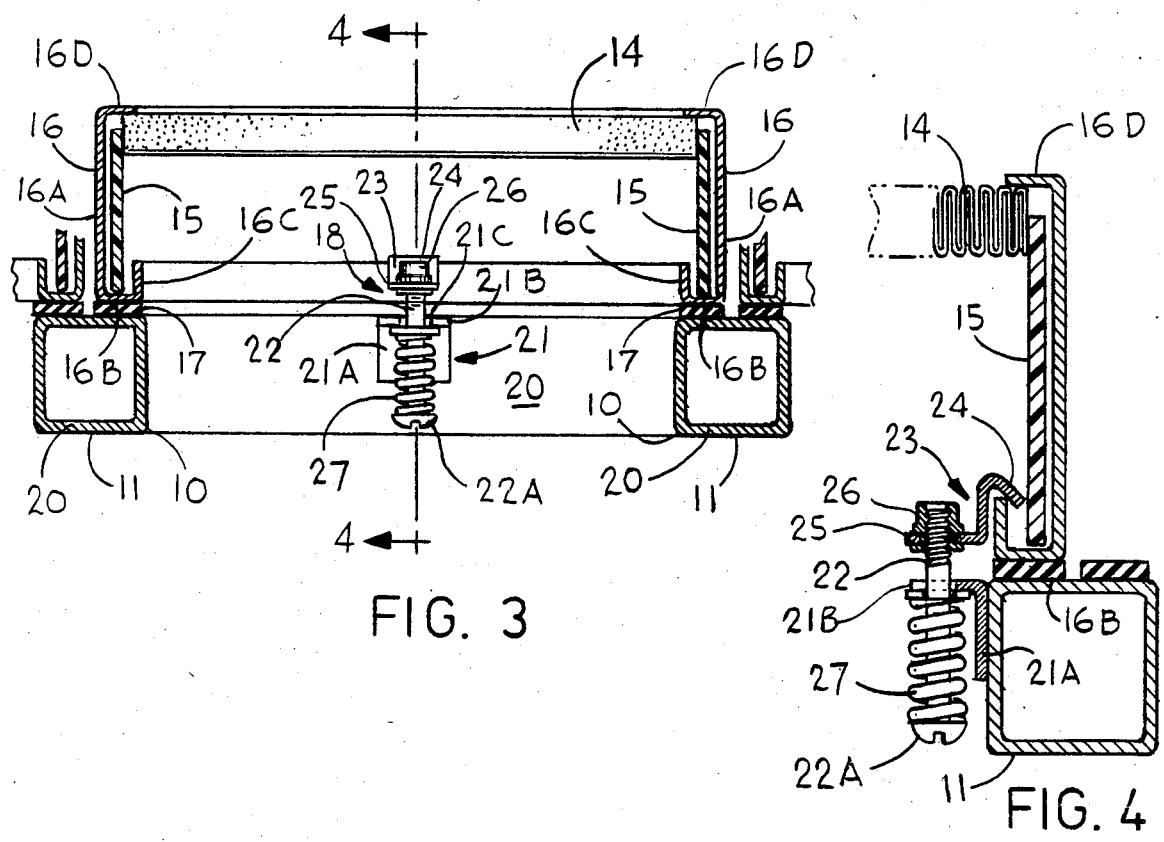
FIG. 3
FIG. 4

AIR FILTER SYSTEM FOR CLEAN ROOM

BACKGROUND OF THE INVENTION

This invention is directed for use in a system for supplying air to a clean room which is filtered to remove substantially all dust and/or bacteria or the like.

In general it has been found that it is preferred that the air enter a clean room from above and pass through filters located in the ceiling. Appropriate ducts are provided at the floor of the room for recirculating or for exhausting the air from the room. Suitable air sources and fans are provided as part of the system to keep the air moving so that clean air is always coming into the room and the old contaminated air is being expelled.

Air filter media having extremely high efficiencies on submicron sized particles have been developed for use in this manner and are generally referred to in the industry as "HEPA" filters. These filter media may comprise or include glass, ceramic or cellulose papers which have the ability to remove a high percentage of the defined particles. Generally the paper media is pleated in accordian fashion and mounted within and sealed along the edges of a frame to form a filter.

Conventionally, overhead air filtering systems are constructed in modular form. Typically a series of rigid supporting frames are mounted in some fashion above the room and form a latticework of rectangular openings through which the air enters the room. These openings are covered with the HEPA filters through which all of the air must pass before entering the room. The greatest problem encountered in systems of this nature is the leakage of air between the support frame and the filter media so it does not get filtered before entering the room. One of the solutions to this problem is an overhead air filtering system disclosed in U.S. Pat. No. 3,486,311 titled "Filter Bank Assembly" by Allan. The Allan assembly provides the overhead latticework of support frames in the form of U-shaped channels which are all interconnected with one another. The channels are filled with a liquid or semiliquid material and the filter is constructed so that the side walls of the filter frame have vertically extended edges which rest in the liquid material contained in the supporting channels. While this system serves the purpose of preventing air leakage around the frame of the filter, it does have its drawbacks. For one, the channels must be tested for liquid leakage and in a large installation leaks may occur even after testing so that fluid if not at least partly solidified, could leak out of the channel and create problems. Another drawback is that the support channels cannot be used for attaching other devices such as light fixtures or sprinkler systems or the like. In addition, it is quite messy to replace and reset a filter.

SUMMARY OF THE INVENTION

A rectangular filter comprises filter media sealingly enclosed in a rectangular frame. The filter frame has vertical side walls, a horizontal inwardly extending rim from the lower edge of the side walls, a flange extending from the inner edge of the rim part way upward with the filter media entirely covering the framed opening. A gasket in the form of a resilient strip of sealing material covers the lower horizontal rim. Preferably a rectangular framework of channel steel bars, or other suitable rigid material such as aluminum, provides a support frame upon which the filter rests with the gasket on the top surface of the support frame and the filter media covering over the entire open area defined by the rectangular support frame. Alternatively the support frame may be made of suitable rigid L bars or flat-sided U bars. For ease of explanation, hereinafter the support frame will be described as made of channel bars but it should be understood that this could include tubular (generally rectangular) bars, flat-sided U bars and L bars. A spring clamp is mounted between the support frame and the flange on the filter frame to adjustably and releasably hold the filter gasket in air tight contact against the supporting frame. The clamp has a clip portion which has a lip at one end which engages the top edge of the flange in the filter frame, a threaded opening at its other end which is engaged by a bolt which passes through an opening in a bracket portion attached to the support frame. The clamp also has a compression spring around the bolt to provide a force to counteract gasket relaxation to help maintain an airtight seal between the filter and the support frame. The bolt is adjustable to adjust the amount of force or pressure.

As a feature of the invention, the resilient seal can be observed when the filter is placed on the support frame and clamped, thereby permitting visual observation that the pressure applied to the gasket is uniform and is not rupturing or otherwise causing some problem with the gasket. Also, from time to time the gasket can be easily inspected visually. A further feature is that the bolt can be loosened and the clip removed from the flange to permit easy removal and replacement of the filter. In addition, the rigid channel support frame can be utilized for attaching light fixtures, sprinkler pipes or other equipment or items which might be needed for use in the room without creating leaks in the system. As will be described later in greater detail, individual modules of support frames can be provided and connected together to form a latticework for a room or a latticework can be formed by a series of elongated channel support bars which are welded or attached together in some suitable fashion at their intersections to form the rectangular openings.

BRIEF DESCRIPTION OF THE DRAWING

FIG. 1 is a fragmentary top plan view showing the general arrangement of an overhead air filtering system utilizing the teachings of this invention;

FIG. 3 is a sectional view taken along viewing lines 3—3 of FIG. 1 showing the details of the construction of a preferred embodiment of the invention; and FIG. 4 is a sectional view as observed along viewing line 4—4 of FIG. 3 showing detail of the clip portion of the clamp utilized in the preferred embodiment of the invention.

DESCRIPTION OF THE PREFERRED EMBODIMENT

Figure 2:
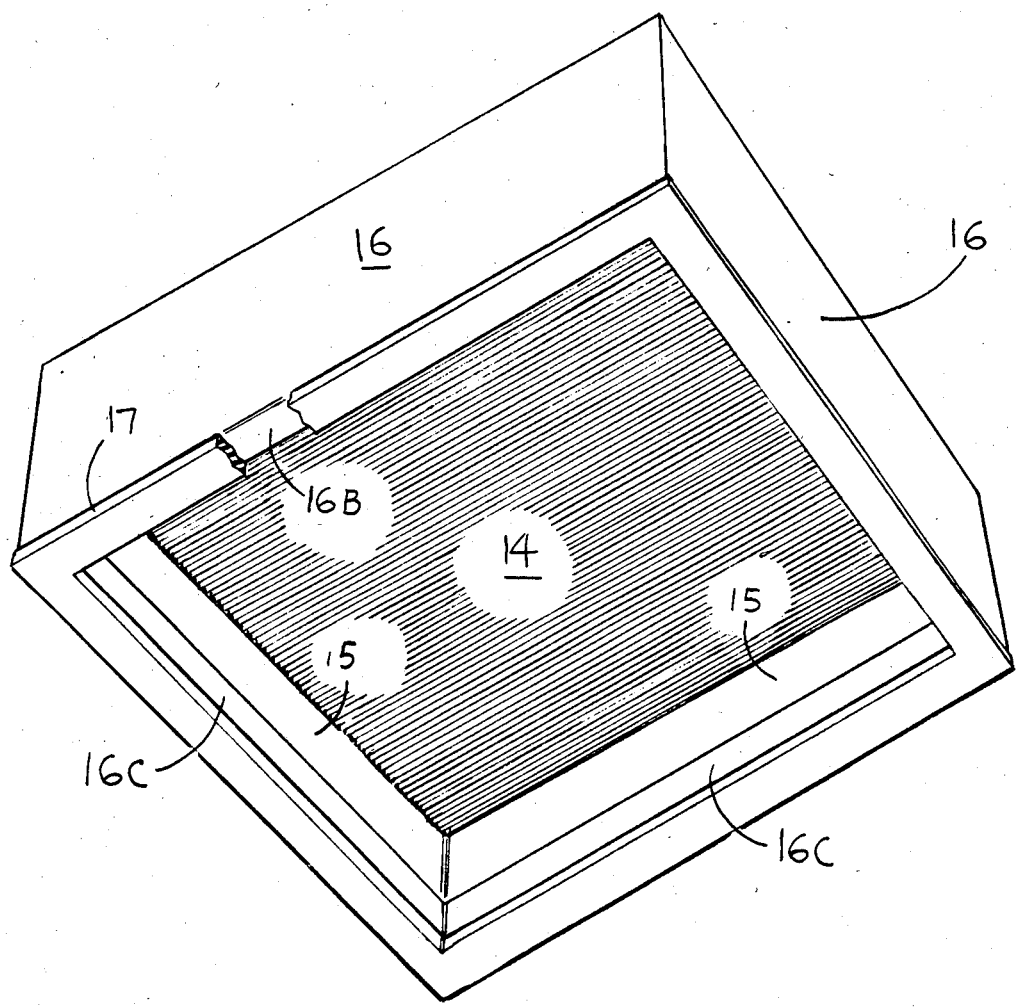
FIG. 2 is a perspective view of a filter used in a preferred embodiment of the invention.

Each of the rectangular air openings 10 in the ceiling of the room is defined by a rectangular support frame 11 comprising four rigid channel side bars. In a preferred embodiment the channel bars are rectangular tubes of steel but they can also be aluminum or other suitable rigid material and can be flat-sided U bars or L bars. Resting on top of each of the rectangular frames 11 and over the opening 10 is a filter 12 with the filter media 14 covering the area of the opening. In some conventional fashion, not shown, which does not constitute part of the instant invention, air for the room is directed to pass through the filter before entering the room. Means, not shown, are also provided to remove contaminated air from the room and either recycle it or expel it. In any event, the concern is that all the entering air pass through the filter media 14 and not leak around the filter 12 and through the opening 10 into the room.

The latticework of openings 10 can be provided by a first series of spaced-apart, parallel elongated rigid channel bars made of steel or aluminum or other suitable material and another series of similar bars running orthogonal to the first series with the various bars connected at their intersections in some suitable fashion such as by welding. Alternatively the latticework can be formed by a group of modules each comprising an individual rectangular frame 11, which are attached to one another side-by-side by welding or bolting or in any other convenient fashion. In any event, the latticework is supported in some fashion at the top of the room, e.g., by columns, not shown, extending upward from the floor or by downward extending supports, also not shown, attached in some fashion to the roof or steel beams of the building. In general the latticework covers the entire ceiling between walls 13 but can also be in just a section of the ceiling with the remainder of the ceiling sealed off. In the following description, for convenience an air filtering module will be considered to constitute a single rectangular support frame 11 with an associated filter 12 covering the opening in the support frame.

The filtering media 14 made of a suitable filter material is sealingly encapsulated or enclosed along its edges in a rectangular casing 15. Preferably the HEPA filter material 14 is accordian pleated paper suitably treated and the edges of the filter media 14 are sealed tightly against its casing 15 which is initially a liquid urethane which is allowed to set to a semi-hard finish. The making and forming of the filter media and sealing it in its casing is not considered part of the instant invention so will not be described in any detail. This encased filter media is commercially available and is well-known in the air cleaning industry and is readily recognized by one of ordinary skill in the art so no further explanation or detail of its construction or characteristics is considered necessary. The encased filter media is enclosed in a rigid, preferably made of steel sheet, rectangular outer frame 16. The filter frame 16 has vertical side walls 16A, a continuous horizontal rim 16B which extends inward from the bottom edges of the side walls 16A, and an upward extending flange 16C from the inner edge of the rim 16B. A further rim 16D extends inward partly over the filter media 14 from the top edge of the vertical wall 16A. Attached to rim 16B by some suitable means such as an acceptable adhesive and covering over rim 16B is a gasket 17 made of a strip of suitable resilient sealing material. The flange 16C preferably runs parallel to the side walls 16A and is spaced slightly away from the filter media casing 15 to provide a gap so that a clamp 18 can grasp the edge of the flange.

Preferably the rectangular support frame for an air cleaning module is constructed out of four rectangular tubular steel side bars 20 which define the air input opening 10. Aluminum or other suitable materials can also be used. A right angled bracket member 21 of clamp 18 has one section 21A welded or otherwise fixedly attached to the inner flat side of one of the tubular steel bars 20 and its other section 21B extending inward from the tubular member. Section 21B contains a slot 21C or opening to receive a threaded bolt 22 having a slotted head 22A. At its other end clamp 18 has a right angled clip member 23 which has a lip 24 for engaging or grasping the upper edge of flange 16C and an inwardly directed horizontal portion 25 containing an opening with an internally threaded retaining nut 26 for receiving bolt 22. Around bolt 22 held between section 21B of bracket 21 and the bolt head 22A is an elongated helical compression spring 27.

In use, with the rigid rectangular support frame 11 in place overhead the filter with its rigid frame 16 is placed on support frame 11 with gasket 17 resting on the support members 20 so that the filter media completely covers opening 10. The lip 24 of clip member 23 is placed over the edge of flange 16 and bolt 22 with surrounding spring 27 is placed in bracket slot 21C and is threaded into nut 26 to pull the filter snugly against the top of the support frame 11. It is preferable that at least one clamp is installed on each side bar 20 of support frame 11 as illustrated in the drawing. Additional clamp 18 can be attached to any single side bar support 20 if desired. As bolt 22 is tightened gasket 17 can be watched to see that the pressure applied against gasket 17 is uniform and is not rupturing the gasket and is creating an airtight seal. As bolt 22 is tightened to draw the filter more firmly against the support frame 11, spring 27 is compressed. After a time, gasket 17 may relax, i.e., lose some of its resiliency. The force applied by spring 27 pushing the bolt head 22A away from bracket section 21B then automatically provides additional force to continue to pull the filter against the support frame to keep the seal airtight. Bolt 22 can be tightened or loosened as necessary to maintain the seal between the filter and the support frame 11. Air for the room is brought from a suitable source, not shown, by ductwork, not shown, to pressurize a plenum above the filter. This is conventional and is not considered part of the instant invention so is not shown nor described in any detail.

As mentioned earlier, devices such as light fixtures or the like can be attached by bolts to any side of the tubular frame support bars 20, except the top side that the gasket rests on, without creating a leak in the air filtering system between the filter and the room.

Although tubular bars are preferred, the support frame members can be upside down L bars with the gasket resting on the horizontal leg and the clamp attached between the vertical leg and the filter frame flange. Also, the support frame members can be flat-sided U bars.

I claim:

1. For filtering air entering a room from a pressurized plenum above:
   (a) filter media sealingly enclosed around its edges in a rectangular casing located under said pressurized plenum;
   (b) a rigid outer frame around said filter media casing having vertical side walls, a horizontal flat rim extending inwardly from the bottom edge of said side walls, and a vertical flange extending upwardly from the inner edge of said rim;
   (c) a gasket comprising a strip of resilient sealing material attached to and entirely covering the outside of said rim;
   (d) a rectangular support frame made of rigid channel bars, said gasket covered rim of said filter frame resting on top of said support frame with said filter media covering over the entire opening defined by said support frame; and (e) clamp means attached to said support frame for engaging said frame flange for adjustably and releasably holding said gasket covered rim in airtight engagement against said support frame.

2. The invention as described in claim 1 wherein said clamp means comprises means adjustably attached at one end to said support frame and having a lip at its opposite end for engaging the edge of said frame flange.

3. The invention as described in claim 1 wherein said clamp means comprises:
   (a) a clip portion having a lip at one end for engaging the edge of said frame flange and a threaded opening at its other end;
   (b) a bracket member fixedly attached to and extending horizontally inward from said support frame, said bracket member having an opening therethrough;
   (c) a threaded bolt having a head at one end and a shank, the shank extending through said bracket opening threadably engaging said clip portion opening with the bolt head at the other end of the shank spaced from said bracket; and
   (d) a spiral compression spring around said bolt shank between said between said bracket member and the bolt head.

4. The invention as described in claim 1 wherein a plurality of said support frames are arranged to form a latticework of rectangular openings with said filter media sealingly covering over each opening in said latticework.

5. An air filtering system for a room comprising:
   (a) a multiplicity of rigid channel support members interconnected to form a latticework of overhead rectangular air openings into a room;
   (b) a plurality of filters each comprising encased filter media sealingly enclosed in a rigid rectangular frame having vertical side walls, a horizontal flat rim extending inward from the lower edge of the side walls, a flange extending upward from the inner edge of said rim, and resilient sealing means over the outside of said rim;
   (c) one of said filters covering each of said latticework air openings with the seal covered rim resting on top of said support members; and
   (d) means attached to said support members for engaging the filter frame flange for adjustably and releasably holding said seal covered rim in airtight engagement against the support members.

6. The invention as described in claim 5 wherein:
   (a) adjacent air openings are formed, at least in part, by common support members with the portion of the seal covered rims along a side of the respective filters covering the respective adjacent air openings resting on said common support members.

7. For filtering air entering a room through rectangular ceiling openings in combination:
   (a) a filter comprising a filter media sealingly enclosed in a rigid rectangular frame, said frame having vertical side walls around the filter media, a narrow lower horizontal flat rim extending inward from the bottom of said side walls, and a flange extending part way upward from the inner edge of said rim;
   (b) resilient sealing means covering the outside of said rim;
   (c) a rectangular horizontal rigid support frame having side members defining a rectangular air entry opening whose length and width dimensions are slightly less than the corresponding dimensions of said filter frame;
   (d) said filter covering the support frame opening with the seal covered rim on the top of said support frame; and
   (e) clamp means attached to said support frame for engaging the filter frame flange for adjustably and releasably holding the filter tightly sealed against the support frame.

8. The invention as described in claim 7 wherein such clamp means comprises:
   (a) a clip portion having a lip at one end for engaging the edge of said frame flange and a threaded opening at its other end;
   (b) a bracket member fixedly attached to and extending horizontally inward from said support frame, said bracket having an opening therethrough;
   (c) a threaded bolt having a head at one end and a shank, the shank passing through said bracket opening threadably engaging said clip portion opening at one end with said bolt head located at the opposite end of said shank and displaced from said bracket member; and
   (d) spiral compression spring means around said bolt shank between said bracket member and said bolt head.

9. The invention as in claim 8 wherever said bolt is threadably adjustable in said clip portion opening for varying the compression force on said spring means.

10. The invention as in claim 8 wherein said bolt is threadably disengageable from said clip portion opening for disconnecting the clamp means from said filter.

* * * * *